US012597201B2

(12) United States Patent
Lee et al.

(10) Patent No.: US 12,597,201 B2
(45) Date of Patent: Apr. 7, 2026

(54) INTERACTIVE METHOD AND SYSTEM FOR DISPLAYING MEASUREMENTS OF OBJECTS AND SURFACES USING CO-REGISTERED IMAGES AND 3D POINTS

(71) Applicant: Reconstruct Inc., Menlo Park, CA (US)

(72) Inventors: Jae Yong Lee, Urbana, IL (US); Derek Hoiem, Urbana, IL (US)

(73) Assignee: Reconstruct, Inc., Menlo Park, CA (US)

( * ) Notice: Subject to any disclaimer, the term of this patent is extended or adjusted under 35 U.S.C. 154(b) by 180 days.

(21) Appl. No.: 18/456,240

(22) Filed: Aug. 25, 2023

(65) Prior Publication Data

US 2025/0069325 A1 Feb. 27, 2025

(51) Int. Cl.
| | |
|---|---|
| *G06T 17/00* | (2006.01) |
| *G06F 3/04815* | (2022.01) |
| *G06T 3/40* | (2024.01) |
| *G06T 7/30* | (2017.01) |
| *G06T 7/60* | (2017.01) |

(52) U.S. Cl.
CPC .......... *G06T 17/00* (2013.01); *G06F 3/04815* (2013.01); *G06T 3/40* (2013.01); *G06T 7/30* (2017.01); *G06T 7/60* (2013.01); *G06T 2207/20101* (2013.01)

(58) Field of Classification Search
None
See application file for complete search history.

(56) References Cited

U.S. PATENT DOCUMENTS

| | | | | |
|---|---|---|---|---|
| 6,434,278 B1* | 8/2002 | Hashimoto | ............. | G06T 17/00 382/285 |
| 2003/0052906 A1* | 3/2003 | Lau | ......................... | G06F 9/451 375/E7.076 |
| 2015/0042654 A1* | 2/2015 | Segasby | ................ | G06T 15/506 345/426 |
| 2016/0292868 A1* | 10/2016 | Hu | .......................... | G06T 17/00 |
| 2023/0239574 A1* | 7/2023 | Dzitsiuk | .............. | H04N 23/959 348/207.99 |

OTHER PUBLICATIONS

Lucas; et al., "An iterative image registration technique with an application to stereo vision," Proceedings of Imaging Understanding Workshop (1981), pp. 121-130.
Schonberger; et al., "Pixelwise View Selection for Unstructured Multi-View Stereo", European Conference on Computer Vision (ECCV) (2016), 17 pgs.

* cited by examiner

*Primary Examiner* — Kent W Chang
*Assistant Examiner* — Jonathan M Cofino
(74) *Attorney, Agent, or Firm* — Ascenda Law Group, PC

(57) ABSTRACT

A scene is displayed from a first view, control points are designated within the scene, and 3D positions of the control points are computed. Thereafter, the scene and each respective control point is displayed from a second view, and the locations of the control points are adjusted as necessary to correspond to their desired locations in the second view. New 3D positions for the control points are computed accordingly. A measurement is determined based on the computed 3D positions of the control points, and the measurement is displayed via a graphical user interface.

12 Claims, 6 Drawing Sheets

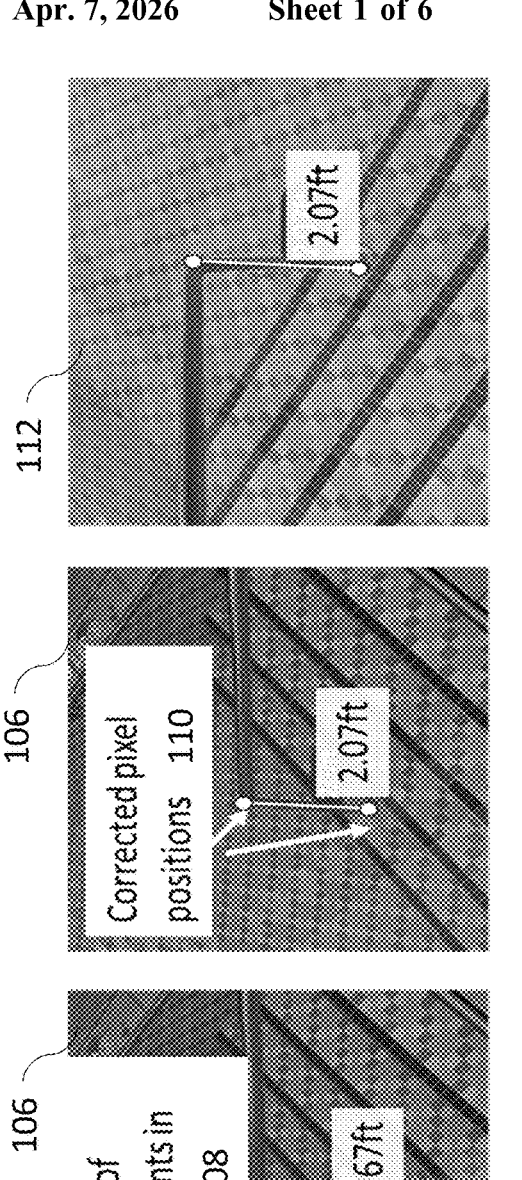
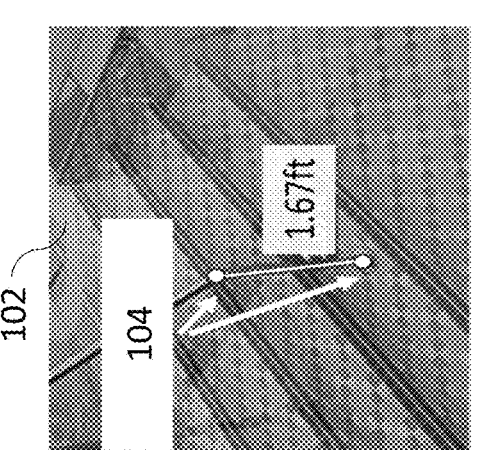
FIG. 1D
FIG. 1C
FIG. 1B
FIG. 1A

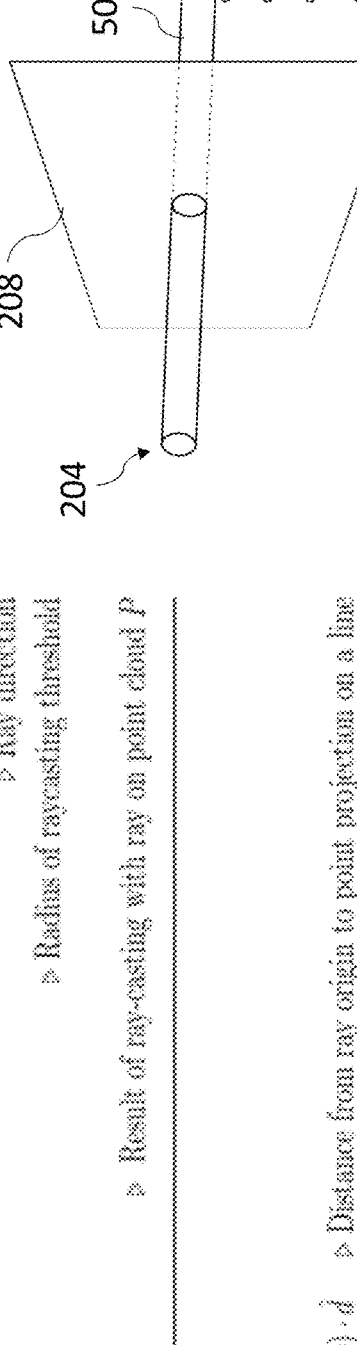

FIG. 5

Procedure 1: Ray-Casting for Point Cloud

Input:
$P \in \mathbb{R}^{N \times 3}$     ▷ Input point cloud of size $N$
$o \in \mathbb{R}^3$     ▷ Ray origin
$d \in \mathbb{R}^3$     ▷ Ray direction
$r \in \mathbb{R}$     ▷ Radius of ray-casting threshold

Output:
$p^* \in P$     ▷ Result of ray-casting with ray on point cloud $P$ $p^* \leftarrow$ None
$t^* \leftarrow \infty$
for $p \in P$ do
  $t \leftarrow (p - o) \cdot d$    ▷ Distance from ray origin to point projections on a line
  $m \leftarrow \|p - o - d \cdot t\|_2$    ▷ Distance between point and a line
  if $m < \gamma$ and $0 < t < t^*$ then
    $t^* \leftarrow t$
    $p^* \leftarrow p$
  end if
end for

FIG. 4

Procedure 2: Point Placement From Two Images Using Triangulation

Input:

$o_r \in \mathbb{R}^3$ ▷ Ray origin of reference image $d_r \in \mathbb{R}^3$ ▷ Ray direction of reference image $o_s \in \mathbb{R}^3$ ▷ Ray origin of source image $d_s \in \mathbb{R}^3$ ▷ Ray direction of source image

Output:

$p^* \in \mathbb{R}^3$ ▷ Result of triangulation between two rays $\vec{n} \leftarrow o_r - o_s$ ▷ Vector from reference ray origin to source ray origin $\vec{m} \leftarrow o_s - o_r$ $d \leftarrow d_r \cdot d_s$ $t_r \leftarrow (\vec{n} \cdot d_s + \vec{m} \cdot d_s \cdot d)/(1 - d^2)$ ▷ Ray intersection solutions with least sq.

$t_s \leftarrow (\vec{n} \cdot d_s + \vec{m} \cdot d_r \cdot d)/(1 - d^2)$ $p^* \leftarrow ((o_r + d_r \cdot t_r) + (o_s + d_s \cdot t_s))/2$

FIG. 8

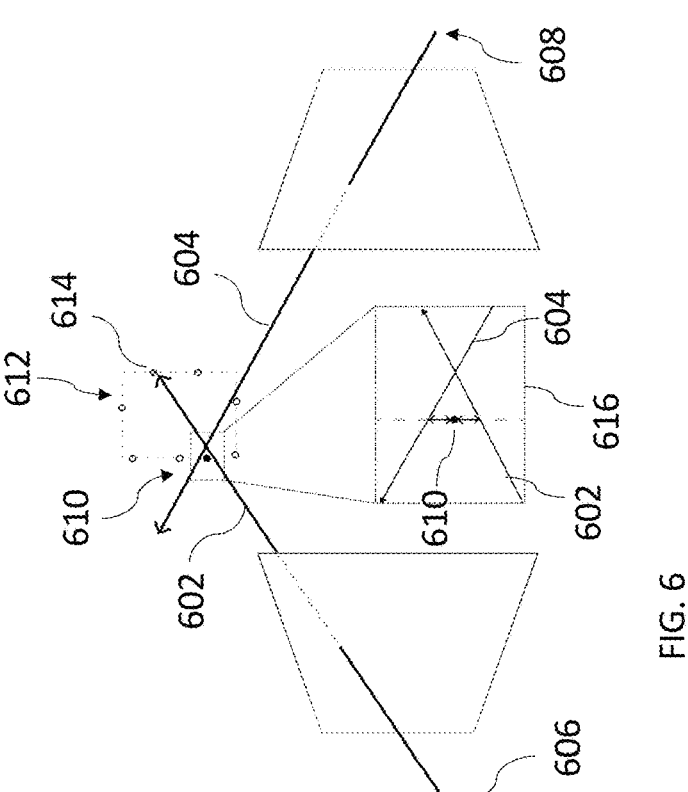

FIG. 6

INTERACTIVE METHOD AND SYSTEM FOR DISPLAYING MEASUREMENTS OF OBJECTS AND SURFACES USING CO-REGISTERED IMAGES AND 3D POINTS

FIELD OF THE INVENTION

The present invention relates to methods and apparatus for displaying measurements of objects and surfaces based on co-registered images and 3D scene geometry.

BACKGROUND

It is often the case that a need to determine the size of an object in an image arises. The desired measurement may be a length, area, volume, or some combination of these dimensions. If a reference item, such as a scale or an object of known dimensions, is included in the image, the task is relatively straightforward. Assuming the reference object is in relative coplanar orientation to the object for which the measurement is desired, then by comparing the known object to the object for which the measurement is desired, the dimensions of the object for which the measurement is desired can be computed.

In cases where no scale or object of known dimensions is included in the image, the task becomes more involved. In some instances, metadata concerning the scene depicted in the image is available to assist in the task. For example, sensor data concerning the scene may provide a point cloud that includes depth and other information concerning items in the scene that allows for computation of the dimensions of objects in the scene. Often, however, measurements determined by such means are subject to inaccuracies.

For example, one challenge in producing accurate measurements from representations of a scene is that a user viewing the images or point cloud can only view and interact with a 2D surface, but a point on that surface actually corresponds to a 3D ray in the scene. Ray-casting methods can select a plausible 3D position based on the ray and point cloud, but often the 3D position does not correspond to the intended surface due to incomplete or inaccurate portions of the point cloud or ambiguity of the intention of the user when multiple surfaces are displayed near the selected pixel. An error will not be apparent to the viewer because both the intended and estimated control point will project to the selected pixel in the display. From a new viewpoint, e.g., a second image, an error will be apparent, but estimating a new control point based on a new pixel in the new view may create a new error. Further, if the 3D point cloud has large missing regions or errors, it may not be possible to select the desired control point from any viewpoint based on any single ray and the point cloud.

SUMMARY

The present invention addresses issues with accurately measuring objects that appear in scenes captured in images. More particularly, embodiments of the present invention provide interactive methods and systems for displaying measurements of objects and surfaces based on co-registered images and 3D scene geometry.

For example, in one embodiment, an interactive system receives two or more co-registered images of the scene along with corresponding three-dimensional (3D) scene geometry. The scene is displayed from a first view by presenting a user with a first of the co-registered images, e.g., via a graphical user interface on a display. Through user interaction with a cursor control device and the first of the co-registered images presented via the graphical user interface, the system receives and accepts designations of each a plurality of desired control points within the scene. Each of these designations may correspond to user-selection of a corresponding pixel coordinate in the first of the co-registered images. According to these selections, the system computes 3D positions of each respective control point based on the corresponding 3D scene geometry and a respective 3D ray originating from a first viewpoint associated with the first view through a corresponding user-selected pixel in the first of the co-registered images to the respective control point. Thereafter, the scene and each respective control point is displayed from a second view corresponding to a second one of the co-registered images that is distinct from the first view. In this presentation, each respective control point is displayed as a corresponding pixel coordinate in the second of the co-registered images. Now, according to user-specified adjustments to at least one of the pixel coordinates in the second of the co-registered images that corresponds to at least one of the control points in the second view, and responsive thereto, the system automatically computes a second 3D ray originating from a second viewpoint associated with the second view and a new 3D position for the at least one control point in the second view based on the 3D ray originating from the first viewpoint and the second 3D ray originating from the second viewpoint. Finally, the system computes a measurement based on the computed 3D positions of the control points and displays the measurement via the graphical user interface.

In various embodiments, the above-described process may also include displaying a portion of the first of the co-registered images in a zoom window corresponding to a magnified portion of the first of the co-registered images to facilitate selection of the pixel coordinate in the first of the co-registered images. And, a guiding line may be displayed in the second of the co-registered images to visualize the 3D ray originating from a first viewpoint in the second view. In some instances, image content may be used to refine the pixel coordinate of the selected pixel in the first of the co-registered images. The second view may be selected automatically based on visibility information from the 3D scene geometry, and each control point may be refined based on image content of the second view.

These and further embodiments of the invention are described in greater detail below.

BRIEF DESCRIPTION OF THE DRAWINGS

The present invention is illustrated by way of example, and not limitation, in the figures of the accompanying drawings, in which:

FIGS. 1A-1D illustrate an example of an interactive process for obtaining a linear measurement of an object in a scene according to an embodiment of the present invention.

FIG. 4 illustrates an example of a procedure for point cloud ray-casting, as shown in FIG. 3.

FIG. 5 illustrates an example of where point cloud ray casting can lead to an erroneous location of a control point when points in a 3D scene geometry are sparsely distributed.

FIG. 6 illustrates an example of multi-ray point placement used to solve the problem of unreliable explicit geometry for determining control point locations.

FIG. 8 illustrates an example of a procedure for control point placement from two images using triangulation.

DETAILED DESCRIPTION

Described herein are interactive methods and systems for displaying measurements of objects and surfaces based on co-registered images and three-dimensional ("3D") scene geometry. The present invention allows for accurate linear, area, and volumetric measurements by utilizing control points in the 3D scene. A user can select pixels in a displayed image to estimate 3D positions of control points, which positions can then be refined through triangulation from additional viewpoints. Distances, areas, and volumes based on the control points can be calculated and displayed to the user. The present invention thus addresses challenges arising from two-dimensional ("2D") display limitations and incomplete and/or ambiguous data in 3D point cloud data, providing enhancements for improved measurement precision.

Figure 10:
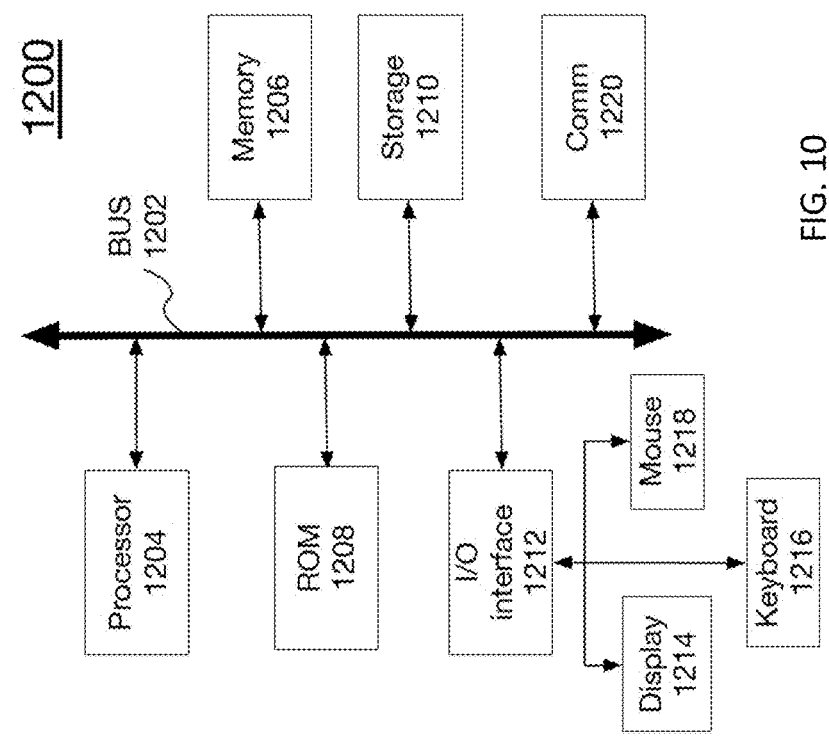
FIG. 10 illustrates an example of a computer system for determining and displaying measurements of objects, surfaces, and volumes based on co-registered images and three-dimensional scene geometry, in accordance with embodiments of the present invention.

Before describing aspects of the present invention in detail, it is helpful to explain some features of an environment within which the invention may be deployed and used. One such environment is a computer system 1200, as depicted schematically in FIG. 10. Computer system 1200 includes a bus 1202 or other communication mechanism for communicating information, and a processor 1204 coupled with the bus 202 for executing instructions and processing information. Computer system 1200 also includes a main memory 1206, such as a random access memory (RAM) or other dynamic storage device, coupled to the bus 1202 for storing information and instructions to be executed by processor 1204. Main memory 1206 also may be used for storing temporary variables or other intermediate information during execution of such instructions by processor 1204 as required by the methods described herein. Computer system 1200 further includes a read only memory (ROM) 1208 or other static storage device coupled to the bus 1202 for storing static information and instructions for the processor 1204. A storage device 1210, such as a magnetic disk, optical disk, or solid state drive is provided and coupled to the bus 1202 for storing information and instructions. In response to processor 1204 executing sequences of instructions contained in main memory 1206, which instructions may be read into main memory 1206 from another computer-readable medium, such as storage device 1210 and/or ROM 1208, computer system 1200 performs the process steps described herein. One or more of main memory 1206, ROM 1208, and/or storage device 1210 may be used to store a 3D BIM or other plan of a construction site, received and/or extracted images of the site, as well as metadata concerning the features depicted in the images and camera pose related thereto.

Computer system 1200 may also include a display 1214 for displaying information to a user, as well as one or more input devices, such as an alphanumeric keyboard 1216, mouse 1218, etc. coupled to the bus 1202 via an input/output interface 1212 for communicating information and command selections to the processor 1204. Computer system 1200 also includes a communication interface 1220 coupled to the bus 1202. Communication interface 1220 provides a two-way, wired and/or wireless data communication path for the computer system, e.g., to/from one or more computer networks and/or network of networks (e.g., the Internet), allowing computer system 1200 to send and receive messages and data.

In accordance with embodiments of the invention, one or more processing devices, such as computer system 1200, may be employed to display, e.g., on display 1214, a visualization of a scene, such as an image or a 3D point cloud, from a first viewpoint. Using a cursor control object, such as mouse 1218, a user may select a pixel in the displayed image using a graphical user interface. Computer system 1200 stores, e.g., in storage device 1210, instructions which may be read into main memory 1206 and which, when executed by processor 1204, cause processor 1204 to estimate the 3D position of the control point based on a 3D ray corresponding to the user-selected pixel from the first viewpoint and the 3D point cloud. These instructions then cause processor 1204 to display the scene and control point from a second viewpoint that is distinct from the first viewpoint. For example, a second image depicting the scene from the second viewpoint may be displayed (either concurrently with the first image from the first viewpoint or in lieu thereof, and the control points selected by the user from the first image may be superimposed over the second image. In the event the control points do not align with the desired positions thereof in the second image, the user may, using mouse 1218 or another cursor control object, adjust the position of the control points to correspond to their desired locations in the second image. This causes processor 1214, in accordance with the stored instructions, to triangulate a new 3D point that lies near the 3D ray from the first viewpoint and a 3D ray from the second viewpoint. The positions of the control points should now be properly located in 3D space in the scene and an accurate dimension is displayed in the graphical user interface for the user. Further details regarding these procedures are explained below.

The present invention thus enables precise measurements of objects and surfaces using co-registered images and 3D points. The measurements may be linear (e.g., the distance from the counter to the wall), area (e.g., the footprint of a room), or volumetric (e.g., the number of cubic yards of dirt in a pile on the ground). The inputs to the system are a set of co-registered images and 3D points that correspond to a scene. The 3D points may be represented, for instance, as depth maps or a point cloud, which could be produced by photogrammetry, Lidar scanners, or other measurement devices. Producing standard units of measurement also requires a known scale factor, such that the distance between any two image locations can be determined in units of feet or meters. Under these assumptions, accurate measurement requires precise selection of 3D points, which we will call "control points," that correspond to desired points in the physical scene. Segments between points, bounding polygons, and other ways of connecting the control points then enable the various forms of measurement to be produced.

Terminology

Co-registered images: Co-registered images have known intrinsic parameters, such as the focal length of the imaging device (e.g., camera) that captured the images and the principal point (the point on the imaging plane of the imaging device through which a ray orthogonal to the imaging plane and passing through the center of the image projection on the imaging plane will pass, i.e., the optical center of the image), when applicable, and have known relative extrinsic parameters, including the 3D position of the camera center and its orientation, up to some global translation. When images are co-registered, a 3D coordinate of an item shown in the images can be estimated from two or more corresponding 2D pixel coordinates in images depicting distinct views.

3D scene geometry: The 3D scene geometry may be estimated via laser scanners, photogrammetry, depth sensors, single view depth estimation, or other methods that use sensors and algorithms to estimate depth, 3D points, or 3D surfaces in the scene. 3D scene geometry may be represented as a collection of 3D point coordinates (a "point cloud"), a mesh or other surface model, or a depth map for each image. The 3D scene geometry enables computation of a 3D coordinate from a pixel in one registered image.

Control point: A control point is a 3D coordinate based on user interactions that will be used as a basis for measurement.

View: A view is a visualization of the scene from a particular position ("viewpoint") and orientation, which could be displayed, for example, as an image, a portion of an image, or a projection of colored points onto a viewing image or surface. Distinct views are assumed to have at least different positions.

3D Ray: A 3D ray consists of a 3D origin position and a 3D direction. A 3D ray can be calculated based on a pixel coordinate and the intrinsic and extrinsic parameters of the image.

Triangulation: A 3D point can be triangulated based on two 3D rays that approximately pass through that point. Given two 3D rays that approximately intersect with the same 3D scene point, the 3D scene point can be triangulated by solving for a point that is close to each ray, or that projects near the pixel coordinates used to generate the rays.

Overview: To help illustrate aspects of the present invention, consider a situation where a user wants to obtain a measurement of an item at a building site without being physically present at the site. Common use cases include facility inspection, construction progress monitoring, construction quality monitoring, and safety monitoring, but the invention is not limited to applications in these situations. To facilitate the desired measurements of the site, a system configured in accordance with embodiments of the invention, such as computer system 1200 above, receives co-registered images of the site, with scaled poses (e.g., views with known locations and orientations relative to one another and a distance between locations at which the images were captured), and 3D scene geometry. As shown in FIG. 1A, the system displays one of the images 102 and the user selects pixels 104 in the image corresponding to control points on the item for which a measurement is desired. In this example, the user-selected pixels 104 are intended to correspond to control points on the top and the bottom of the railing shown in the image. The system estimates the 3D location of the control points based on the provided 3D scene geometry information and computes a distance between the control points according to those estimated positions. In each case, the estimated position of a control point is determined by analyzing a 3D ray originating from the first view through the selected pixel and points near the ray in the 3D scene geometry. The estimated distance is displayed to the user.

The measurement obtained from only the first view (FIG. 1A) may be inaccurate, due to errors in the provided 3D scene geometry. That is, the actual locations of the control points estimated by the system may not align with the intended locations in the scene. This discrepancy becomes apparent when the user navigates to the second view of the scene 106, as shown in FIG. 1B. The projection 108 of the control points designated in the first view 102 is displayed in the second view 106 where it is apparent that the control points do not actually align with the top and the bottom of the railing, as intended.

The measurement can be corrected using an interactive process in at least a second view (distinct from the first view) by allowing the user to relocate the control points to correspond to pixels in the second image associated with the intended locations in the scene. In this example, as illustrated in FIG. 1C, the user moves the control points, e.g., using a cursor control device such as a mouse, to corrected locations 110, so as to align with the intended locations on the railing. As a result of this movement of the control points, the system updates its estimates of the 3D locations of the control points using triangulation based on the pixel positions in the first and second views 102, 106, and the known center positions of those views. The corrected measurement is then displayed to the user, and viewing the points from a third view 112 (that is, in a third image), as shown in FIG. 1D, confirms that the control points are now in the intended 3D positions.

Displaying the scene: The scene may be displayed as an image (as in FIGS. 1A-1D), a mesh, a 3D point cloud, or another visualization depicting a representation or model of the appearance of the scene as observed from a particular viewpoint. The scene may be displayed on a monitor, such as display 1214, augmented reality/virtual reality glasses, or other computational display device.

Figure 2:
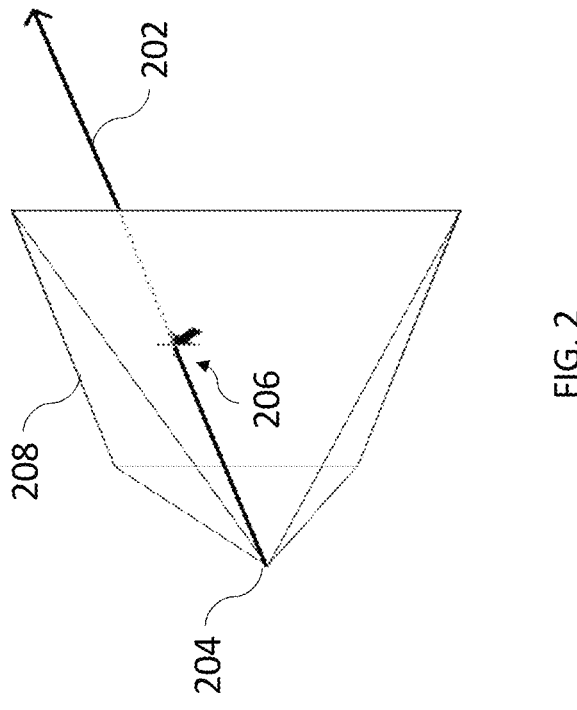
FIG. 2 illustrates an example of ray formulation for locating a position of a control point.

Estimating a location of a control point based on a pixel selected from one viewpoint and the 3D point cloud: The user may interact with the displayed scene using a mouse, touchpad, or other device to select a pixel coordinate. Given image parameters and 3D scene geometry, a 3D control point may be estimated from the pixel coordinate using ray-casting, where the ray is formed by the points passing through the camera center of the current view and the 3D position corresponding to the projection of the pixel coordinate onto a view frustum plane. FIG. 2 illustrates an example of such ray formulation. The ray 202 is formed by passing two points; the origin of the camera (camera center) 204 and the projection of selected pixel coordinate (cross) 206 on the image plane 208. The point at which the ray 202 intersects the image plane 208 provides a first estimate of the control point.

Ray-casting thus may be used to identify the first intersection of 3D scene geometry with the ray. As an example, if the scene geometry is represented with a triangular mesh, the intersection can be computed by solving a ray-triangle intersection for each triangle and returning the intersecting triangle with the smallest positive distance along the ray from the ray origin (camera center) 204.

Figure 3:
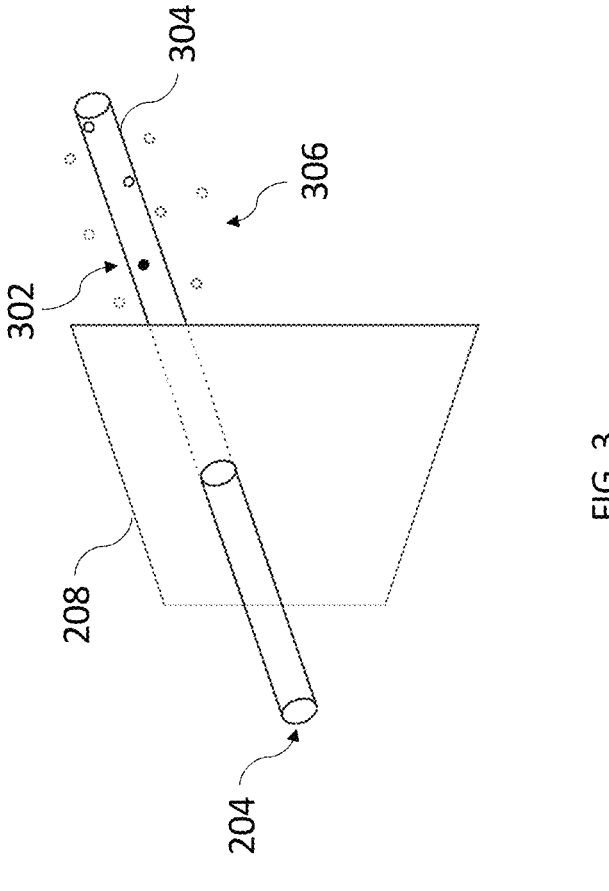
FIG. 3 illustrates an example of point cloud ray-casting.

Similarly, if the 3D scene geometry is represented as a set of 3D points, an intersection can be computed by casting a cone or cylinder with arbitrary radius or angle, and returning the intersecting point with the smallest positive depth. FIG. 3 illustrates an example of identifying a 3D point 302 from a 3D ray 304 and a point cloud 306, and the procedure set forth in FIG. 4 provides one method for computing the location of the 3D point. Given a 3D ray, a cylinder with some width can be defined around the ray. Then, the nearest point in a 3D point cloud can be returned as the 3D point indicated by the ray and scene geometry. In FIG. 3, the filled circle 302 represents the closest point from the 3D point cloud 306 that is within the cylinder. Solid white circles represent other points within the cylinder, and the dotted circles represent points that are not contained within the cylinder. The procedure of FIG. 4 returns the point within a point cloud that has the smallest positive distance along the ray, among all points that are within radius distance to the ray. Alternatively, a plane or surface can be fit to multiple close points, and the intersection of the ray with that surface can be returned. This method ensures that the returned 3D point will be exactly along the ray.

In some cases, the first estimate of the location of a control point may be of satisfactory precision to satisfy the measurement requirements. In many cases, however, the first estimate may not correspond to the 3D scene point desired by the user, especially when the 3D scene geometry is incomplete or inaccurate.

For example, if points in a portion of the 3D scene geometry are sparsely distributed, the cylinder corresponding to a ray cast may pass through the closest surface and erroneously return a control point that corresponds to a more distant surface. FIG. 5 illustrates this case. In this example, the ray-casting cylinder 504 is thin compared to the density of the point cloud 506, and so the ray has "passed through" the nearest surface 508 and intersected with a point 502 on a more distant surface, returning an erroneous control point. This problem often occurs for portions of scene surfaces for which depth is difficult to estimate, including near boundaries, in low texture regions for photogrammetry, or surface with strong specular reflectance or very low diffuse reflectance. Using a thicker cylinder often does not solve the problem because it may lead to other imprecisions or incorrectly selected surfaces (e.g., resulting in the control point being erroneously assigned to a surface that is too close). Additionally, the estimate of 3D scene geometry may be imprecise or entirely missing in portions of the scene, in which case precisely determining the control point from a single ray is not possible.

Refining control points based on corresponding pixel coordinates selected in at least two viewpoints: Given the initial estimate of one or more control points, we can refine their positions from a second viewpoint, or multiple additional viewpoints, using triangulation. We first show that multi-ray point placement solves the problem of unreliable explicit geometry for the point placement. FIG. 6 illustrates an example of such multi-ray placement.

With two or more rays 602, 604, from different cameras 606, 608, respectively, a location of a control point can be estimated by solving for the point 610 with minimum summed distance to all rays. This allows a control point to be precisely specified, even when the provided scene geometry is incomplete or inaccurate. The black dot 610 in point cloud 612 indicates the result of multi-ray point placement, while the gray dot 614 indicates the single-ray point placement for only the left camera 606. Whereas single ray-casting may have led to the erroneous placement of a control point based on the location of point 614, the use of two rays, one from each of a different view, to determine the point cloud point that has a minimum summed distance to all rays allows for accurate locating of the corresponding control point. The center image in FIG. 6 illustrates a zoomed in version of the multi-ray intersection, where 616 represents the surface of the object. The triangulated point 610 computed as the 3D point with a minimum sum of distances to the rays does not depend on the scene geometry, but only on the accuracy of the provided image registration parameters and selected pixel coordinates.

Figures 7A, 7B:
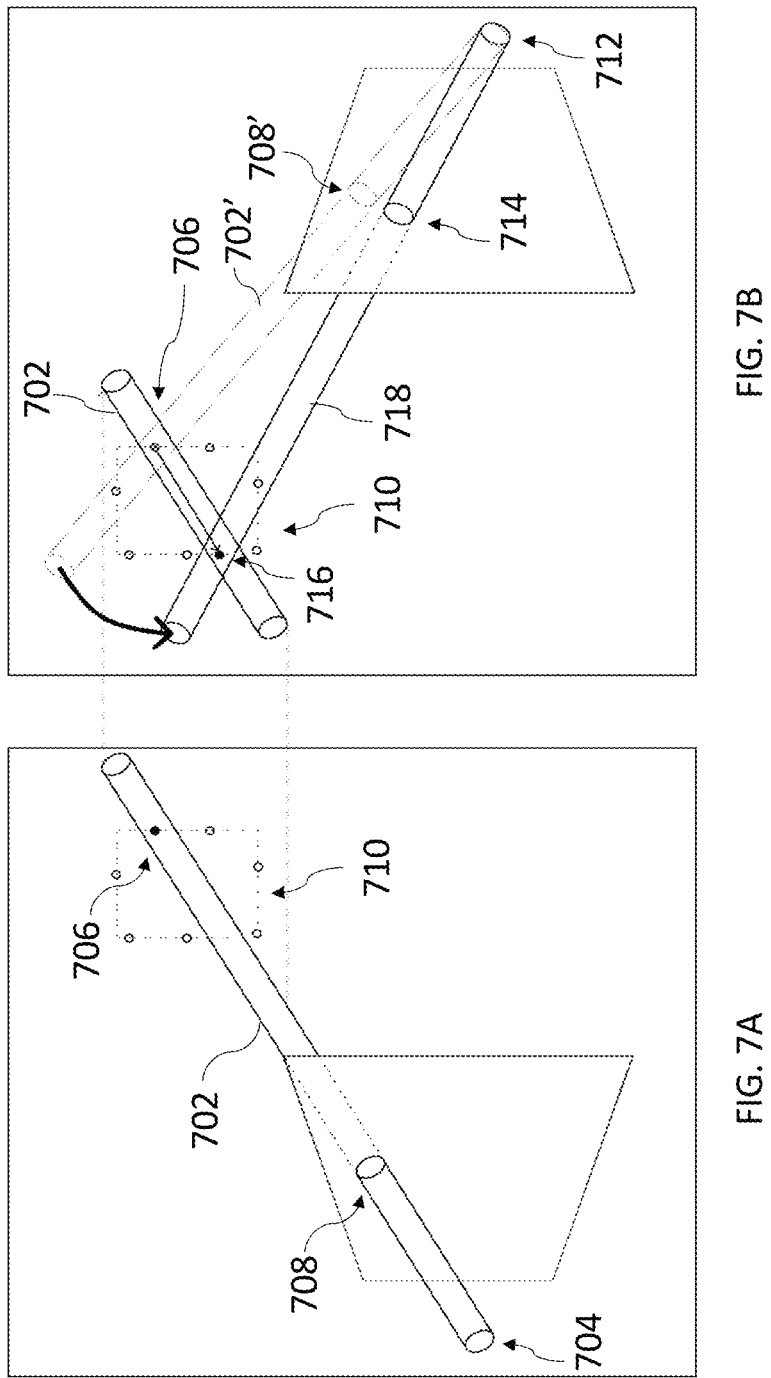
FIGs. 7A and 7B illustrate schematically a process for refining the location of a control point based on pixel locations of an object in at least two views.

In one embodiment of the present invention, triangulation of the kind illustrated in FIG. 6 is provided via an interface which allows refining of an initial estimate of a control point location using pixel coordinates selected in at least one additional view. This is illustrated schematically in FIGS. 7A and 7B. In FIG. 7A, a user selects a pixel coordinate 708 in a first view (e.g., a first image of a scene displayed on a display 1214) taken from a camera position 704, resulting in an initial control point estimate based on the location of a point 706 in a point cloud 710 nearest to a ray cast 702, as discussed above. Given the initial estimated location of the control point, that initial estimated location is projected into a second view, as shown in FIG. 7B. The second view corresponds to a second image taken from a camera location 712. The initial estimated location of the control point in the second view corresponds to a ray 702' which includes 3D point 706.

From the second view, however, the user can determine that the pixel location 708' associated with initial estimated location of the control point is not properly aligned with its intended location in the scene. This was the situation, for example, with the control points associated with the railing as shown in FIG. 1B. So, the user refines the control point placement in the second view by dragging it (e.g., using a cursor control device such as mouse 1218) to correspond to the desired pixel location 714 in the second view. This is illustrated in FIG. 7B by the relocation of ray 702' to become ray 718, which includes 3D point 716 in point cloud 710. The control point position is then updated using triangulation, as discussed above, from the two rays 702, 718, corresponding to the viewpoints 704, 712, and selected pixel coordinates 708, 714.

In various embodiments of the invention, the system may present the second, distinct view of the scene to the user either in response to user selection of an image or automatically, for example as determined to be an informative view of the scene previously designated as such or simply a next sequential (in space and/or time) view of the scene. The system displays the position of each estimated control point projected into a currently-displayed view, along with the resulting measurement. Errors in initial control point location estimates are typically apparent in at least a second view, hence, the user is afforded the opportunity to interact with the system to drag or replace a projected control point to select a new pixel coordinate in the current view.

FIG. 8 provides an example of a procedure for triangulating an updated estimate of the location of a control point based on rays from a first view and a second view. In this process, given a reference image (from a first camera viewpoint) and a source image (from a second camera viewpoint), this process solves for the point that has the minimum sum of least squares distance to both rays. Although this method of estimating the control point does not depend on the initial estimate, the initial estimate is still important to simplify the interaction and provide an indicator to the user of which scene point was intended. For example, suppose the user clicks on two corners of a door frame in one view, intending to measure the length of the doorframe. If an initial estimate of the control point based on the scene geometry is not available, it may be difficult for the user to indicate which control points are being refined through additional interactions. This may especially be problematic if, for example, measuring the perimeter of an object such as a rust spot or dirt pile, in which multiple control points may be relatively close together. Further, the initial estimate of control points could be verified as correct in the second view, requiring no further adjustment, so the ability to provide an estimate from a single view can save time.

Other methods for solving for a triangulated point are also possible. For example, a process that minimizes the L1 distance or reprojection error may be used. More than two views can also be used, for example by finding the point that minimizes the sum of distances to all rays. Hartley, Richard, and Zisserman, Andrew. "Multiple view geometry in computer vision," (Cambridge University Press, 2003) provides examples of such additional methods.

Calculating and Displaying Measurements: Given the control points, a variety of measurements can be performed, with the desired type of measurement and units of measurement specified using a graphical user interface. For example, a linear measurement between each pair of adjacent control points can be calculated as the Euclidean distance between the 3D positions of the control points. Other measurements, such as vertical distance, area, volume, footprint, or cut-and-fill can also be calculated. The measurement can be displayed as text on the monitor (as shown in FIGS. 1A-1D) and/or exported (e.g., printed) in a report.

Further improvements: We now describe several additional improvements that facilitate user interaction and selection of intended control points.

Figure 9:
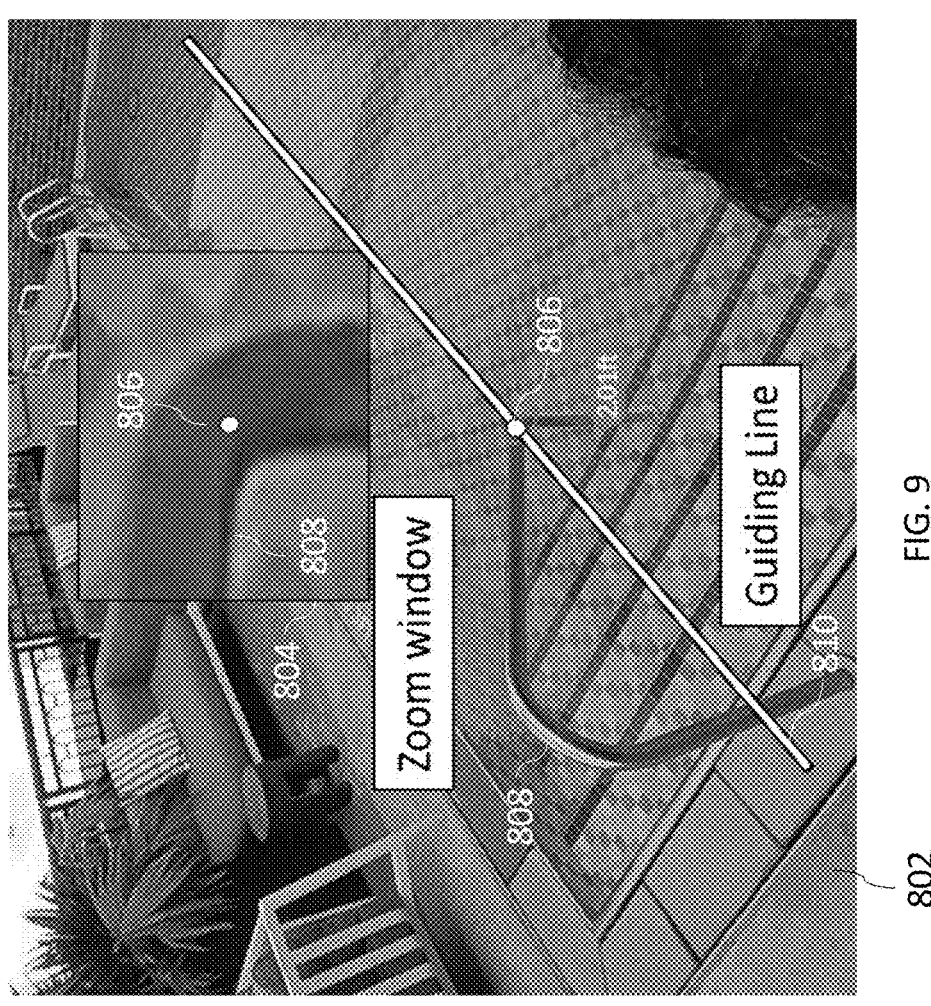
FIG. 9 Illustrates an example of a zoom window for aid in control point selection, according to an embodiment of the invention.

Referring to FIG. 9, a zoom window may be used to aid a user in selecting an intended pixel position within a scene more precisely. Image 802 shows a view of the same general scene from FIGS. 1A-1D, in which the user wishes to place one control point 806 at the top of railing 808. While the user is moving a cursor, a close up or zoom window 804 portion of the image 802 is shown near the cursor position to facilitate precise selection of a pixel position. The zoom window 804 displays the image information with an enhanced number of display pixels per image pixel, for example by cropping and resizing the portion of the image and displaying it in an additional canvas. The size of the zoom window 804 may be made user configurable (e.g., through a sliding control) or it may be fixed at some number of pixels wide by an equal or different number of pixels long.

In addition to the zoom window, a guiding line 810 may be used to show the projection of a ray in the second view that corresponds to the selected pixel in the first view. When multiple control points are placed and the initial estimated positions of control points are poor, it may be difficult to determine which control points correspond to which intended scene points from the first image (e.g., image 102 from FIG. 1A). A guiding line 810 may be shown in the second view, either automatically or in response to user selection, that corresponds to the projection of the ray through the selected pixel in the first view. In this example, the image shown in FIG. 9 would correspond to such a second view. The user then knows that the corrected pixel location should be somewhere along or near the guiding line. This can help clarify which scene point was intended for a given control point. Annotations may be added to the image for clarity in grayscale viewing.

Automatic Snapping: In some embodiments, the selected pixel may be automatically refined by selecting a high contrast pixel near the user's cursor. For example, the image intensity gradient can be computed in the row and column directions, and the pixel within a small window, such as a three-pixel radius, of the user's cursor position with the largest magnitude can be selected. This can reduce interaction time and improve precision of pixel selection.

Automatic Additional View Selection: In some embodiments, the system may be configured to automatically determine a second view that is useful for interaction. This second view should be similar but distinct from the first view and should provide unoccluded views of the control points estimated in the first view. A second view can, therefore, be selected as having an orientation with an angular distance within some user-specified or default configured range from the orientation of the first view, having a user-specified or default configured positional distance within some range from the first view, and having visibility to the estimated control points based on the provided scene geometry.

Automatic Refinement from Second and Additional Views: As an alternative to requiring the user to correct the pixel position in the second, and possibly additional, views, best-matching pixel positions can be found automatically in these views using template matching. To do so, images from nearby (spatially or temporally) views are loaded. Then, stepping in small increments, a score is obtained for a range of depth values along the ray from the first view's origin (cameral location) through the first selected pixel. The score may correspond, for example, to a normalized cross-correlation value of an area of a few pixels square around the selected pixel in the first view to areas of a few pixels square around each corresponding pixel in the additional views. The corresponding pixel in each additional view is computed by projecting the 3D point specified by the ray and depth onto that view. B. D. Lucas and T. Kanade, "An iterative image registration technique with an application to stereo vision," Proceedings of Imaging Understanding Workshop, pp. 121-130 (1981) provides one example of two-view matching. Schoenberger, Johannes Lutz, et al., "Pixelwise View Selection for Unstructured Multi-View Stereo", European Conference on Computer Vision (ECCV) (2016) provides an example of how to score a depth value corresponding to a pixel based on matching areas of a few pixels square in multiple views.

Thus, methods and apparatus for displaying measurements of objects and surfaces based on co-registered images and 3D scene geometry have been described.

What is claimed is:

1. A method to display a measurement using an interactive system, comprising:

a. receiving, by the system, two or more co-registered images of a scene and corresponding three-dimensional (3D) scene geometry;

b. displaying, by the system, the scene from a first view by presenting to a user, via a graphical user interface on a display, a first of the co-registered images;

c. accepting, from the user, designations of a plurality of desired control points within the scene, each of said designations corresponding to a user-selection of a corresponding pixel coordinate in the first of the co-registered images via the graphical user interface and a cursor control device of the interactive system;

d. computing 3D positions of each respective control point based on the corresponding 3D scene geometry and a respective first 3D ray originating from a first viewpoint associated with the first view through a corresponding user-selected pixel in the first of the co-registered images;

e. displaying the scene and each respective control point from a second view corresponding to a second one of the co-registered images that is distinct from the first view, wherein each respective control point is displayed as a corresponding pixel coordinate in the second of the co-registered images;

f. receiving from the cursor control device adjustments to at least one of the pixel coordinates in the second of the co-registered images corresponding to at least one of the control points in the second view, and, responsive thereto, automatically computing, for each of the adjusted at least one of the pixel coordinates, (i) a second 3D ray originating from a second viewpoint associated with the second view and based on the adjusted pixel coordinate and (ii) a new 3D position for the at least one control point based on the respective first 3D ray originating from the first viewpoint and the second 3D ray originating from the second viewpoint, wherein the adjustments by the cursor control device comprises at least one adjusted pixel coordinate in the second one of the co-registered images; and g. computing a measurement based on the computed 3D positions of the control points and displaying the measurement via the graphical user interface.

2. The method of claim 1, further comprising displaying a portion of the first of the co-registered images in a zoom window corresponding to a magnified portion of the first of the co-registered images to facilitate selection of one or more of the pixel coordinates in the first of the co-registered images.

3. The method of claim 1, further comprising displaying a guiding line in the second of the co-registered images to visualize the respective first 3D ray originating from the first viewpoint in the second view.

4. The method of claim 1, wherein image content is used to refine the pixel coordinate of the corresponding user-selected pixel in the first of the co-registered images.

5. The method of claim 1, wherein the second view is selected automatically based on visibility information from the 3D scene geometry.

6. The method of claim 5, wherein each control point is refined based on image content of the second view.

7. An interactive system comprising a processor and a memory coupled to the processor, the memory storing instructions which, when executed by the processor, cause the processor to perform steps comprising:

a. displaying, via a display communicably coupled to the processor, a scene from a first view by presenting, via a graphical user interface displayed on the display, a first of two or more co-registered images;

b. accepting, via an input received through the graphical user interface and a cursor control device of the inter-active system, designations of a plurality of desired control points within the scene, each of said designations corresponding to a corresponding pixel coordinate in the first of the co-registered images;

c. computing 3D positions of each respective control point based on 3D scene geometry corresponding to the two or more co-registered images and a respective first 3D ray originating from a first viewpoint associated with the first view through a corresponding user-selected pixel in the first of the co-registered images;

d. displaying, via the graphical user interface displayed on the display, the scene and each respective control point from a second view corresponding to a second one of the co-registered images that is distinct from the first view, wherein each respective control point is displayed as a corresponding pixel coordinate in the second of the co-registered images;

e. receiving, via an input received through the graphical user interface and a cursor control device of the inter-active system, adjustments to at least one of the pixel coordinates in the second of the co-registered images corresponding to at least one of the control points in the second view, and, responsive thereto, automatically computing, for each one of the adjusted at least one pixel coordinates, (i) a second 3D ray originating from a second viewpoint associated with the second view and based on the adjusted pixel coordinate and (ii) a new 3D position for the at least one control point based on the respective first 3D ray originating from the first viewpoint and the second 3D ray originating from the second viewpoint, wherein the adjustments by the cursor control device comprises at least one adjusted pixel coordinate in the second one of the co-registered images; and f. computing a measurement based on the computed 3D positions of the control points and displaying the measurement via the graphical user interface.

8. The interactive system of claim 7, wherein the memory further stores instructions which, when executed by the processor, cause the processor to display a portion of the first of the co-registered images in a zoom window corresponding to a magnified portion of the first of the co-registered images to facilitate selection of one or more of the pixel coordinates in the first of the co-registered images.

9. The interactive system of claim 7, wherein the memory further stores instructions which, when executed by the processor, cause the processor to display a guiding line in the second of the co-registered images to visualize the respective first 3D ray originating from the first viewpoint in the second view.

10. The interactive system of claim 7, wherein the memory further stores instructions which, when executed by the processor, cause the processor to use image content to refine the pixel coordinate of the corresponding user-selected pixel in the first of the co-registered images.

11. The interactive system of claim 7, wherein the memory further stores instructions which, when executed by the processor, cause the processor to automatically select the second view based on visibility information from the 3D scene geometry.

12. The interactive system of claim 11, wherein the memory further stores instructions which, when executed by the processor, cause the processor to refine each control point based on image content of the second view.

* * * * *